(12) United States Patent
Kanbara et al.

(10) Patent No.: US 7,008,714 B1
(45) Date of Patent: *Mar. 7, 2006

(54) POLYMER ELECTROLYTE FUEL CELL

(75) Inventors: Teruhisa Kanbara, Toyonaka (JP); Kazuhito Hatoh, Osaka (JP); Junji Niikura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 275 days.

This patent is subject to a terminal disclaimer.

(21) Appl. No.: 10/111,261

(22) PCT Filed: Oct. 20, 2000

(86) PCT No.: PCT/JP00/07357

§ 371 (c)(1),
(2), (4) Date: Apr. 22, 2002

(87) PCT Pub. No.: WO01/29922

PCT Pub. Date: Apr. 26, 2001

(30) Foreign Application Priority Data

Oct. 21, 1999 (JP) .................................. 11-299646

(51) Int. Cl.
*H01M 8/02* (2006.01)
*H01M 8/10* (2006.01)

(52) U.S. Cl. ........................................... 429/34
(58) Field of Classification Search .................. 429/32, 429/34–36
See application file for complete search history.

(56) References Cited

U.S. PATENT DOCUMENTS

| | | | | |
|---|---|---|---|---|
| 4,758,631 A | * | 7/1988 | Kennedy et al. | 525/245 |
| 5,110,691 A | * | 5/1992 | Krasij et al. | 429/35 |
| 6,316,139 B1 | * | 11/2001 | Uchida et al. | 429/36 |
| 6,436,567 B1 | * | 8/2002 | Saito et al. | 429/34 |
| 6,440,597 B1 | * | 8/2002 | Mizuno | 429/34 |
| 6,451,468 B1 | * | 9/2002 | Adachi | 429/35 |
| 6,531,236 B1 | * | 3/2003 | Hatoh et al. | 429/34 |
| 2003/0134173 A1 | * | 7/2003 | Yasumoto et al. | 429/35 |

FOREIGN PATENT DOCUMENTS

| | | | |
|---|---|---|---|
| EP | 0529102 A1 | * | 3/1993 |
| EP | 0 935 303 A1 | | 8/1999 |
| JP | 59-188673 U | | 12/1984 |
| JP | 60-65405 A | | 4/1985 |
| JP | 64-054607 A | | 3/1989 |
| JP | 06333580 A | | 12/1994 |
| JP | 7-102017 A | | 4/1995 |
| JP | 09097619 A | * | 4/1997 |
| JP | 11219714 A | * | 8/1999 |
| JP | 11345620 A | | 12/1999 |
| WO | WO 99/05737 A1 | | 2/1999 |
| WO | WO 9953559 A1 | * | 10/1999 |

* cited by examiner

*Primary Examiner*—Gregg Cantelmo
(74) *Attorney, Agent, or Firm*—Akin Gump Strauss Hauer & Feld, LLP

(57) ABSTRACT

The invention relates to a polymer electrolyte fuel cell comprising a polymer electrolyte film of hydrogen ion conduction; an anode and a cathode between which the electrolyte film is placed; a conductive separator having a channel through which fuel gas is supplied to the anode, and a conductive separator having a channel through which oxidative gas is supplied to the cathode. The conventional conductive separator uses a carbon material that is unlikely to be less costly, and an attempt has been made to use a metal plate in place of the carbon material. Since the metal plate is exposed to an oxidizing atmosphere at high temperature for a long time, however, corrosion may occur, disadvantageously causing the efficiency of power generation to decrease gradually. The polymer electrolyte fuel cell of this invention uses an acid-resistant conductive airtight elastomer as a conductive separator for substantial cost reduction.

2 Claims, 3 Drawing Sheets

POLYMER ELECTROLYTE FUEL CELL

TECHNICAL FIELD

The present invention relates to a fuel cell, using polymer electrolyte, to be used for e.g. portable power sources, power sources for electric vehicles and domestic cogeneration systems.

BACKGROUND ART

In a fuel cell using polymer electrolyte, electric power and heat are simultaneously generated by electrochemically reacting a fuel gas containing hydrogen with a fuel gas, such as air, containing oxygen. This fuel cell is basically constituted by a pair of electrodes, i.e. anode and cathode, formed on opposite surfaces of a polymer electrolyte membrane, which selectively transports hydrogen ions. The above electrodes are each comprising a catalyst layer having, as a main constituent, a carbon powder carrying a platinum group metal catalyst, and a diffusion layer having both gas permeability and electronic conductivity.

Furthermore, in order to prevent the fuel gas and the oxidant gas, to be supplied to the electrodes, from leaking to outside, and to prevent the two kinds of gases from intermingling with each other, a gas sealing material and a gasket are arranged, at a periphery of the electrodes, to sandwich the polymer electrolyte membrane. These sealing material and gasket are preliminarily assembled integrally with the electrodes and the polymer electrolyte membrane. This is called MEA (electrolyte membrane-electrode assembly). Outside the MEA, electrically conductive separator plates for electrically connecting neighboring MEAs in series are arranged. A gas flow channel for supplying a reactive gas to the electrode surface and for carrying away a produced gas and an excessive gas is formed at a portion of the separator, which portion is to contact with an MEA. The gas flow channel can be provided separately from the separator plate, but such manner is generally used as to provide a groove, as a gas flow channel, at the surface of each separator plate.

In order to supply a fuel gas and an oxidant gas to such grooves, it becomes necessary to prepare a piping jig which divides pipes, for respectively supplying the fuel gas and the oxidant gas, into a number of branches corresponding to the number of used separator plates, and which directly and fittedly connects the respective branches to the grooves of the separator plates. This jig is called manifold. The above type of manifold, which enables direct and fitted connection from the supply pipes for the fuel gas and the oxidant gas, is called external manifold. There is another type of manifold, called internal manifold, which has a simpler structure. In the internal manifold, a separator plate having a gas flow channel formed thereon is provided with through-holes, and the inlet and outlet of the gas flow channel are connected to the through-holes so as to enable direct supply of the fuel gas and the oxidant gas.

Since a fuel cell generates heat during its operation, it needs to be cooled by e.g. a cooling water in order to maintain the cell at a good temperature state. Usually, a cooling member to flow a cooling water is provided for every 1 to 3 cells. In one type of such, the cooling member is inserted between a separator plate and a separator plate. In another type, a cooling water flow channel is provided, as a cooling member, at a rear surface of a separator plate. The latter type is more often used. In a general cell stack structure, these MEAs, separator plates and cooling members are alternately stacked so as to form a stack of 10 to 200 cells, and such stacked body is sandwiched by end plates via a current collecting plate and an insulating plate, the both ends being fixed by tightening bolts.

In such a polymer electrolyte fuel cell, the separator plates need to have a high electric conductivity, a high gas tightness against the fuel gas and the oxidant gas, and further a high corrosion resistance to the reaction upon oxidation/reduction of hydrogen/oxygen. For these reasons, a conventional separator plate was usually constituted by a carbon material such as glassy carbon and expanded graphite, wherein a gas flow channel was made by cutting the surface of the plate, or by molding using a mold in the case of expanded graphite.

According to the conventional carbon plate cutting method, it was difficult to lower the cost of the carbon plate material and the cost of cutting it. Likewise, in the case of expanded graphite, the material cost is high. These are considered as obstacles for commercialization.

Recently, the use of a metal plate such as stainless steel is attempted in place of the carbon material having been conventionally used.

However, in the above case of using the metal plate, corrosion and dissolution of the metal plates occur after a long period use, because the metal plate is exposed to an oxidizing atmosphere of about pH 2 to 3 at a high temperature. When the metal plate gets corroded, its electric resistance at the corroded portion increases, and the output of the cell decreases. Further, when the metal plate gets dissolved, the dissolved metal ions are diffused in the polymer electrolyte, and are trapped at ion exchange sites of the polymer electrolyte, whereby consequently the polymer electrolyte itself gets lowered in its ionic conductivity. For these causes, it has been a problem that when a metal plate, as is, is used for the separator plate, and the cell is operated for a long period, its power generation efficiency gradually gets lowered.

In order to avoid such deterioration, it has been a usual way to subject the surface of the metal plate to gold plating having some thickness. Furthermore, such separator as being made of an electrically conductive resin made by mixing a metal power in e.g. an epoxy resin has been studied. (See Japanese Laid-Open Patent Publication Hei 6-333580.)

As described above, in the case of a method of making a separator by cutting a glassy carbon plate, the material cost per se of the glassy carbon plate is high, and further it is difficult to lower the cost for cutting it. Expanded graphite having been press-machined has a problem of mechanical strength of the material. When it is used as a power source of an electric vehicle, cracks may be produced therein due to vibrations and shocks during driving. The separator made of a metal plate having gold plating has a problem of the gold plating cost. In the case of a separator made of an electrically conductive resin, its electric conductivity is lower than that of glassy carbon or a metal plate, and further the surface of the resin is hard. Therefore, in order to lower its electric resistance at a contact portion thereof with an electrode, tightening by a strong pressure is necessary, whereby the resultant cell structure becomes complicated.

DISCLOSURE OF INVENTION

The present invention provides a polymer electrolyte fuel cell comprising a novel electrically conductive separator in order to solve the above problems.

The polymer electrolyte fuel cell according to the present invention comprises: a hydrogen ion conductive polymer electrolyte membrane; an anode and a cathode for sandwiching therebetween the hydrogen ion conductive polymer electrolyte membrane; and an anode side electrically conductive separator having a gas flow channel for supplying a fuel gas to the anode, and a cathode side electrically conductive separator having a gas flow channel for supplying an oxidant gas to the cathode, wherein each of the anode side and cathode side electrically conductive separators comprises an electrically conductive gas tight elastic body having acid resistance.

The above electrically conductive gas tight elastic body preferably comprises: a polymer elastic body as a base material which has, as a principal chain backbone, polyisobutylene represented by formula (1) or ethylene-propylene random copolymer represented by formula (2); and at least an inorganic electrically conductive agent mixed with the base material.

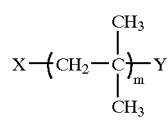

(1)

where X and Y are polymerizable functional groups, and m is an integer of 1 or above, representing repetition number of isobutylene oligomer.

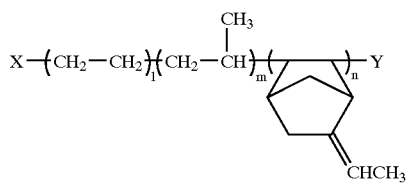

(2)

where X and Y are polymerizable functional groups, and 1, m and n represent integers of 1 or above.

BEST MODE FOR CARRYING OUT THE INVENTION

Figure 1:
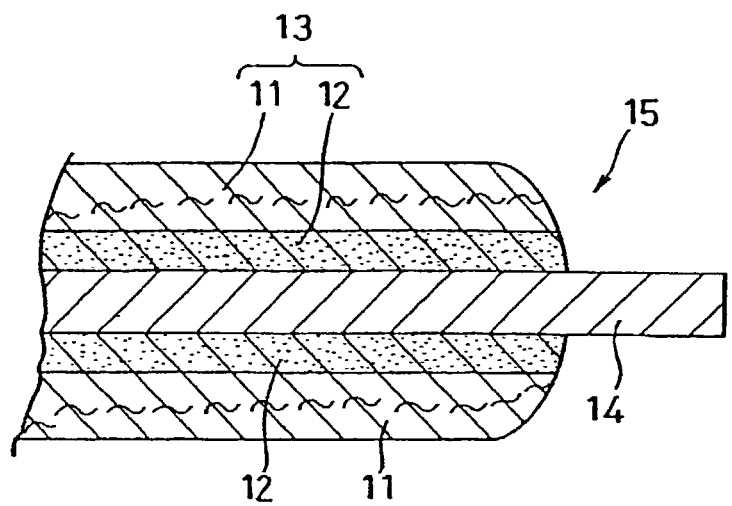
FIG. 1 is a vertical cross-sectional view of a main part of MEA, showing its structure in a fuel cell according to an Example of the present invention.

A polymer electrolyte fuel cell according to the present invention has an electrically conductive separator comprising an electrically conductive gas tight elastic body having acid resistance. The electrically conductive gas tight elastic body preferably comprises: a polymer elastic body as a base material, represented by formula (1) or (2); and at least an electrically conductive agent, mixed in the base material, such as carbon powder and carbon fiber. It is true that this electrically conductive gas tight elastic body has a lower electric conductivity than that of glassy carbon or metal plates. However, the body has an elasticity. Therefore, by contacting a separator comprising this electrically conductive gas tight elastic body with an MEA under an appropriate pressure, the electrically conductive elastic body fittedly intrudes into the surface of e.g. a carbon paper constituting a porous electrode positioned at outside of the MEA, so that the contact resistance between the separator and the MEA can be lowered.

The separator comprising an electrically conductive gas tight elastic body does not have a risk of crack production, in contrast to the case of carbon plates, upon vibrations under pressurized situation. Furthermore, corrosion in an acid atmosphere can be prevented, in contrast to the case of separators made of metal plates, by selecting the base materials and the electrically conductive agents.

The present inventors have investigated base materials to meet the above requirements. Consequently, it has been found that polymer elastic bodies each having, as its principal chain backbone, the polyisobutylene represented by the formula (1) and the ethylene-propylene random copolymer represented by the formula (2) are superior as to the gas tightness, acid resistance and heat resistance, and thus are particularly suitable for the base material. The polymer elastic body having a principal chain backbone of the formula (1) or (2) can be realized to have an optimum elasticity for a separator of the polymer electrolyte fuel cell by selecting its degree of polymerization. Further, at a liquid state of the material before polymerization, an electrically conductive agent such as acetylene black powder and graphite fiber can be mixed therein. By pouring the liquid material into a mold, and subjecting it to electron beam irradiation to cure it, a sheet thereof is obtained. In another way, the above liquid material can be injection-molded to form a sheet thereof. In such way, a sheet having grooves for fuel or oxidant gas supply can be continuously produced. With respect to this point as well, machining for producing separators can be very much simplified in comparison with the conventional carbon plates and metal plates.

The polymer represented by the formula (1) is such one as made in a manner that isobutylene oligomers each, as 1 unit, having a repetition number m and having terminal functional groups X and Y added thereto are crosslinked at the terminal functional groups thereof. As the elements X and Y, such groups can be used as allyl group, acryloyl group, methacryloyl group, isocyanate group and epoxy group. Those functional groups are of polyfunctional group, so that if they are employed as crosslinking points, post-polymerization polymers are crosslinked in a matrix form to have a network structure. The material properties of the polymers having such structure are significantly influenced by the repetition number m of isobutylene oligomer, total degree of polymerization, and kinds of terminal functional groups in the polymer material represented by the formula (1). According to the study by the present inventors, in the case that such material is used as a sealing material in the polymer electrolyte fuel cell, the repetition number m of isobutylene oligomer is preferred to be $56 \leq m \leq 72$, on the average 64.

In the case that the terminal functional groups X, Y are of allyl group, acryloyl group or methacryloyl group, curing is carried out by electron beam irradiation. On the other hand, in the case that the terminal functional groups are of isocyanate group, urethane bonding is made with the aid of water, while in the case of epoxy group, a known amine type curing agent such as ethyldiamine is used to carry out the curing with heat.

Groups to be usable as the terminal functional groups X and Y of the ethylene-propylene random copolymer represented by the formula (2) are such as acryloyl group, methacryloyl group, isocyanate-group and epoxy group. With those polyfunctional groups as crosslinking points, obtained polymers are crosslinked in a matrix form to have a network structure. Material properties of such polymers are significantly influenced by 1, m and n of the formula (2), total degree of polymerization 1+m+n, and kinds of the terminal functional groups. In the case that such materials are used as sealing materials in polymer electrolyte fuel cells, the result of the study by the present inventors has indicated that the numbers 1 and m are each preferred to be 2,000 to 15,000, n is preferred to be about 100 to 500, and the degree of polymerization 1+m+n is preferred to be 5,000 to 20,000. Polymerization can be carried out, in a manner similar to the above case of isobutylene oligomer represented by the formula (1), through a curing reaction by the use of electron beam irradiation, urethane bonding due to water, or an amine type curing agent with heat in correspondence with the kinds of the terminal functional groups.

A powder or fiber of electrically conductive carbon powder, its fiber and a silver powder are preferably used as the inorganic electrically conductive agents each to be mixed with a polymer elastic body, which functions as a base material, and which has, as a principal chain backbone, polyisobutylene represented by the above formula (1) or ethylene-propylene random copolymer represented by the above formula (2). Regarding the mixing proportions of the base material and the inorganic electrically conductive agent, suitable proportion is 90 to 30 wt % of the former and 10 to 70 wt % of the latter. If the inorganic electrically conductive agent is in an amount less than 10 wt %, the electrical resistance becomes high, while if the inorganic electrically conductive agent is in an amount larger than 70 wt %, curing does not occur.

Hereinafter, a mode for carrying out this invention is described with reference to the drawings.

FIG. 1 is a vertical cross-sectional view showing a structure of an MEA. Reference numeral 11 is a diffusion layer comprising a carbon paper, and 12 is a catalyst layer formed on one surface thereof. The combination of both layers is called an electrode 13. A pair of electrodes, each being such, are arranged to sandwich a polymer electrolyte membrane 14, whereby an MEA 15 is structured.

Figure 2:
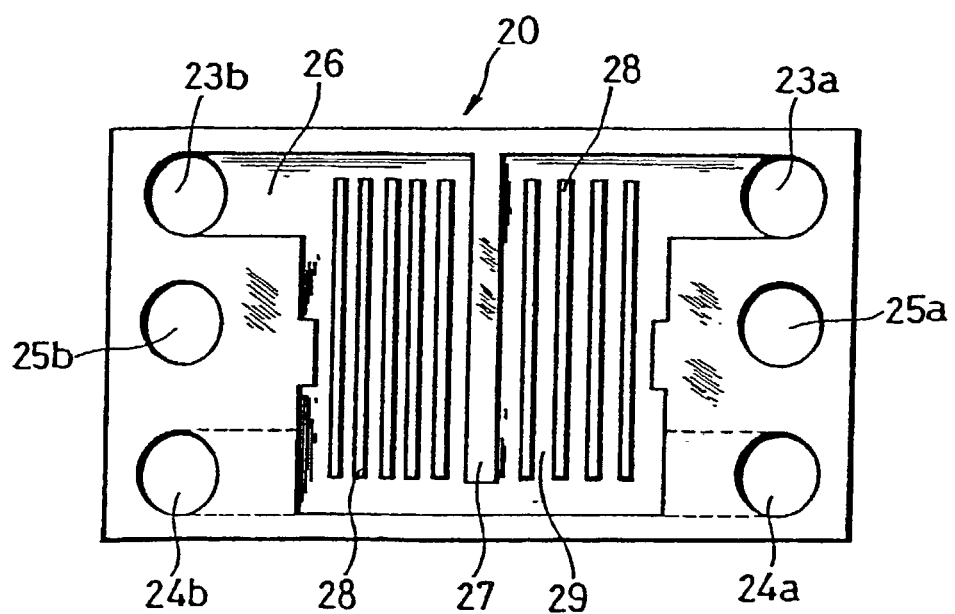
FIG. 2 is a front view of a separator, seen from a cathode side, used in the fuel cell according to the Example of the present invention.
Figure 3:
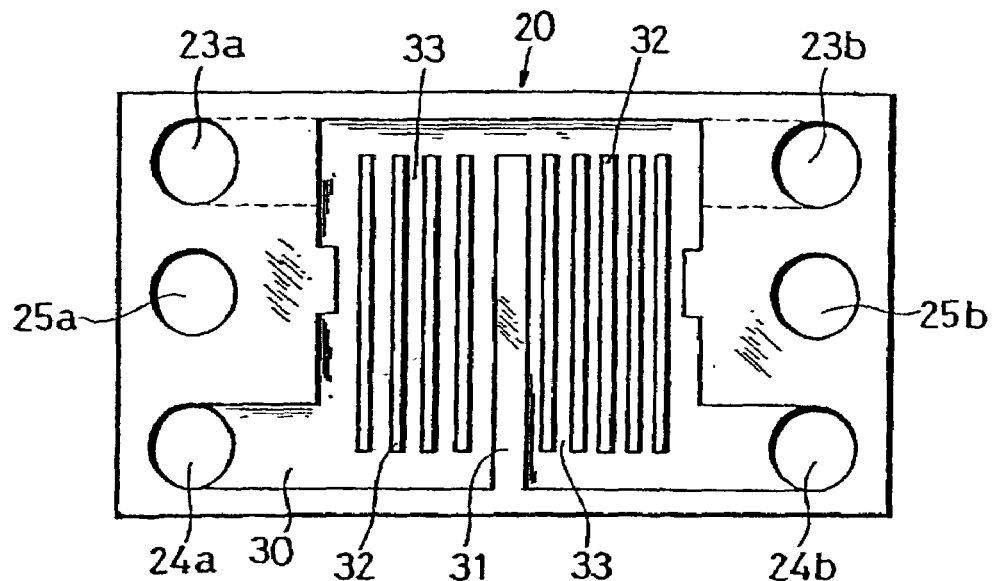
FIG. 3 is a rear view of the separator.

FIG. 2 is a front view of an electrically conductive separator, seen from a cathode side. FIG. 3 is its rear view, which is a front view thereof seen from an anode side. This electrically conductive separator 20 functions simultaneously as cathode side electrically conductive separator and anode side electrically conductive separator. The separator 20 has, at an end portion thereof, a through-hole 23a of oxidant gas supply side, a through-hole 24a of fuel gas supply side, and a through-hole 25a of cooling water supply side, while the separator has, at another end portion thereof, a through-hole 23b of oxidant gas exhaustion side, a through-hole 24b of fuel gas exhaustion side, and a through-hole 25b of cooling water exhaustion side. On a surface of the separator 20 facing a cathode, a groove 26 to be connected from the through-hole 23a to the through-hole 23b is formed. In this groove, a rib 27 to divide the groove at its central portion, and a group of ribs 28 to form a plurality of parallel gas flow channels 29 are provided.

On the other hand, on a surface of the separator 20 facing an anode, a groove 30 to be connected from the through-hole 24a to the through-hole 24b is formed. In this groove, a rib 31 to divide the groove at its central portion, and a group of ribs 32 to form a plurality of parallel gas flow channels 33 are provided.

The electrically conductive separator 20 is such one as to be inserted between unit cells. A cathode side separator to be placed at the end of a cell stack having stacked plural unit cells has, on one surface thereof, a gas flow channel as shown in FIG. 2, whereas the other surface of the cathode side separator is plane. Further, an anode side separator to be placed at the end of the cell stack has a gas flow channel as shown in FIG. 3, whereas the other surface of the anode side separator is plane.

Figure 4:
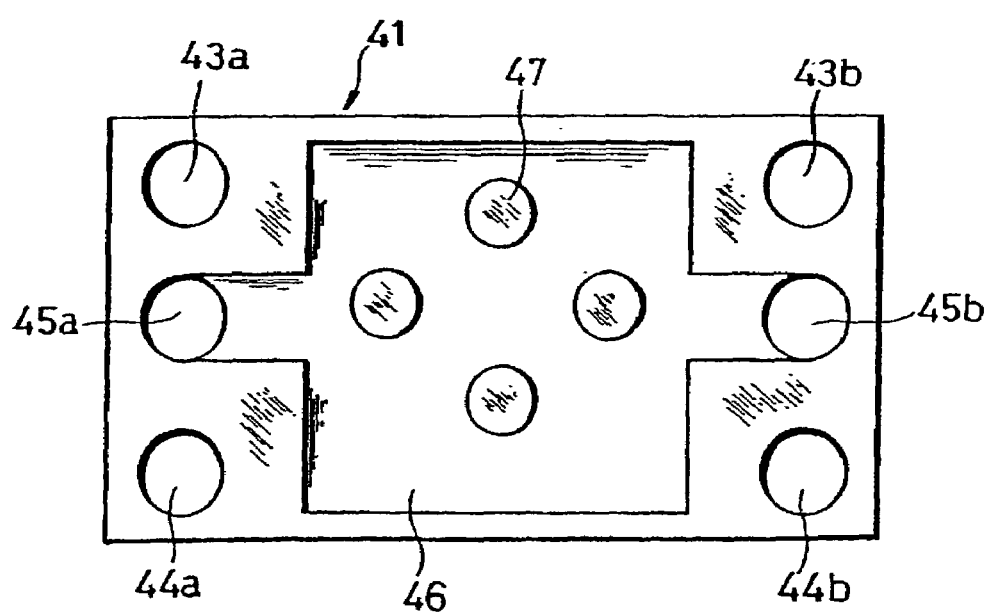
FIG. 4 is a front view of another separator used in a fuel cell according to the Example of the present invention.

FIG. 4 is a front view of an electrically conductive separator at its face having a cooling water flow channel. As in the case of the separator 20, this electrically conductive separator 41 has, at an end portion thereof, a through-hole 43a of oxidant gas supply side, a through-hole 44a of fuel gas supply side, and a through-hole 45a of cooling water supply side, whereas it has, at another end portion thereof, a through-hole 43b of oxidant gas exhaustion side, a through-hole 44b of fuel gas exhaustion side, and a through-hole 45b of cooling water exhaustion side. On one surface of the separator 41, a groove 46 to be connected from the through-hole 44a to the through-hole 44b for forming a cooling water flow channel is formed. In this groove, a plurality of circular shaped ribs 47 are provided.

A pair of separators, each being of the electrically conductive separator 41, are coupled in a manner such that the respective surfaces of the separators each having the cooling water flow channel 46 face each other, so as to structure a cooling member to allow a cooling water to flow therebetween. On a rear surface of one of such separators, an oxidant gas flow channel is formed, whereas on a rear surface of the other of such separators, a fuel gas flow channel is formed.

Figure 5:
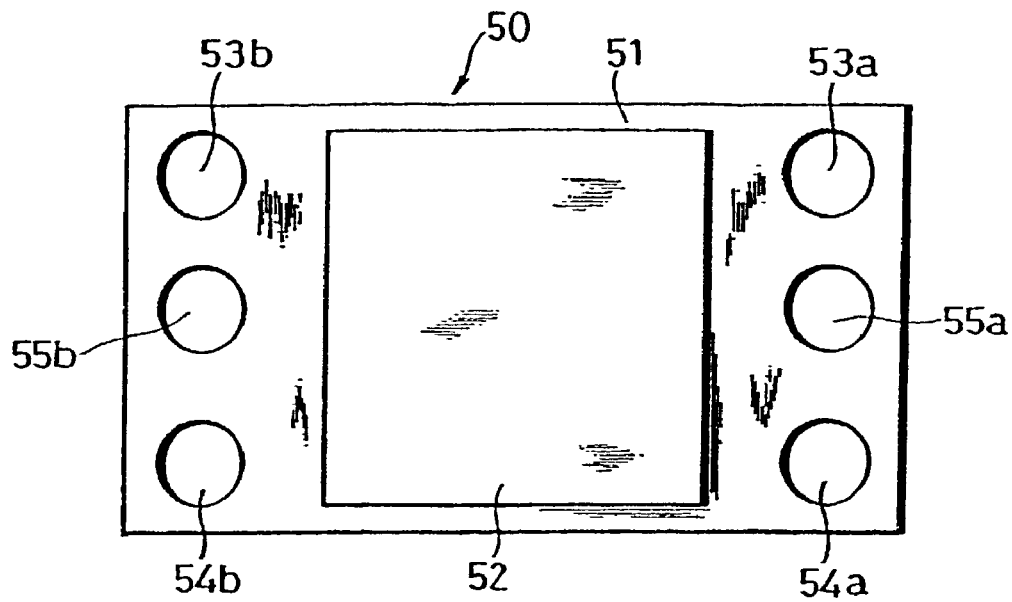
FIG. 5 is a front view of an MEA sheet used for the fuel cell according to the Example of the present invention.

FIG. 5 is a front view of an MEA. The MEA 50 comprises a polymer electrolyte membrane 51 and electrodes 52 to sandwich the membrane. The polymer electrolyte membrane 51 has, at one end portion thereof, a through-hole 53a of oxidant gas supply side, a through-hole 54a of fuel gas supply side, and a through-hole 55a of cooling water supply side, while it has, at its another end thereof, a through-hole 53b of oxidant gas exhaustion side, a through-hole 54b of fuel gas exhaustion side, and a through-hole 55b of cooling water exhaustion side.

In the Example illustrated hereinafter, plural MEAs 50 each shown in FIG. 5 were stacked via a separator 20 between MEAs, and separator 41 pairs each to form the above cooling member were inserted into the stack for every two cells. Then, a gasket having through-holes provided in pairs, respective pairs being for oxidant gas, fuel gas and cooling water, was placed between the electrolyte membrane 51 and the electrically conductive separator so as to embrace the electrode 52 at the periphery of the electrode.

EXAMPLE 1

First of all, a method of making an electrode will be described here.

An acetylene black powder was allowed to carry platinum particles having an average particle size of 30 Å, wherein the weight ratio of acetylene black and platinum was 3:1. This catalyst powder was dispersed in isopropanol. With this dispersion was mixed an ethyl alcohol dispersion of a perfluorocarbon sulfonic acid powder represented by the formula (3), thereby to obtain a catalyst paste.

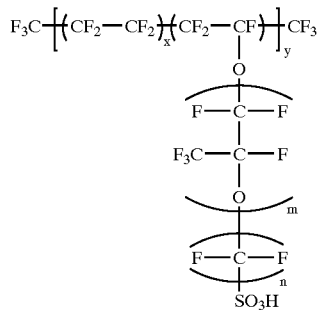

(3)

wherein $5 \leq x \leq 13.5$, $y \approx 1000$, $m=1$, and $n=2$. Meanwhile, a carbon paper to be a supporting body for supporting an electrode was subjected to water repelling treatment. A carbon nonwoven fabric (TGP-H-120: product of Toray Industries, Inc.) having an outer dimension of 8 cm×10 cm and a thickness of 360 μm was immersed in an aqueous dispersion (Neoflon ND1: product of Daikin Industries, Inc.) of fluorocarbon resin, and was dried, and then was heated at 400° C. for 30 minutes so as to give the water repellency. On one surface of this carbon nonwoven fabric, the above catalyst paste was coated by screen printing, and was dried to form a catalyst layer. A part of the catalyst layer was buried into the carbon nonwoven fabric. Thus, an electrode comprising a catalyst layer and a carbon nonwoven fabric was made. Adjustment was made so that the electrode contained 0.5 mg/cm² of platinum, and 1.2 mg/cm² of perfluorocarbon sulfonic acid.

Thereafter, an MEA was made by hot pressing a pair of electrodes on a front surface and a rear surface, respectively, of a proton conductive polymer electrolyte membrane having an outer dimension of 10 cm×20 cm, in a manner that the catalyst layers of the electrodes get in contact with the electrolyte membrane. The proton conductive polymer electrolyte membrane used here was made by using a perfluorocarbon sulfonic acid of the above formula (3), where $5 \leq x \leq 13.5$, $y \approx 1000$, $m=2$, and $n=2$, and was formed to a thin film having a thickness of 50 μm.

In the following, a method of making an electrically conductive separator will be described.

A formulated concentrate for separators was prepared by sufficiently mixing a mixture of: 100 g of a raw liquid material represented by the formula (1), where the repetition number m of isobutylene oligomer was within a range of 56 to 72, on the average 64, and both functional groups X and Y were allyl group; 50 g of acetylene black; 50 g of fibrous graphite (having an average diameter of 50 μm, and an average length of 0.5 mm); and 200 g of methyl ethyl ketone for viscosity adjustment. This formulated concentrate was poured into a mold made of stainless steel, and maintained at 50° C. in a reduced pressure atmosphere of 0.2 atmospheric pressure for 1 hour, whereby the methyl ethyl ketone therein was evaporated. Then, an electrically conductive sheet was made by subjecting the thus processed material to electron beam irradiation of an accelerating voltage of 500 keV and an exposure quantity of 50 Mrad so as to polymerize the allyl groups at the terminals of the isobutylene oligomers. The degree of polymerization was about 10,000.

When the repetition number m of the isobutylene oligomer was selected to be smaller than 56, the resultant sheet after polymerization was hard, and thus its contact resistance with an MEA could not be lowered unless the tightening pressure for cell assembling was heightened. On the other hand, when m was selected to be larger than 72, the resultant sheet was so soft that grooves of gas flow channels formed on a separator surface were crushed by the tightening pressure for cell assembling. Influences by the degree of polymerization were studied by controlling the exposure quantity of the electron beam, whereby it was found that when the degree of polymerization was lower than 5,000, the resultant sheet was too soft, and the grooves of the gas flow channels were crushed as in the case described above.

The thus made electrically conductive sheet was subjected to cutting and blanking machining, thereby to make such electrically conductive separators 20 having a structure as shown in FIG. 2 and FIG. 3, and such separators 41 having a flow channel for cooling water as shown in FIG. 4. Separator 20 had a size of 10 cm×20 cm, and a thickness of 4 mm, while the depths of the grooves 26 and 30 were 1.5 mm, the widths of the ribs 28 and 32 were 1 mm, and the widths of the gas flow channels 29 and 33 between the ribs were 2 mm.

Separator 41 had a size the same as the separator 20, where the depth of the groove 46 to function as a cooling water flow channel was 1.5 mm.

Next, in the proton conductive polymer electrolyte membrane of MEA as made above, through-holes for flowing an oxidant gas, a fuel gas and a cooling water were formed as shown in FIG. 5. By combining 50 pieces of such MEA with the above electrically conductive separators 20 and 41, a cell stack was assembled. At each one of the both ends of the cell stack, a current collecting plate made of stainless steel, an insulating plate of electrically insulating material, and an end plate were stacked and were fixed thereto by tightening rods. Here the tightening pressure selected was 4 kgf/cm² per unit area. Regarding tightening, the cell according to the present Example was found to realize cell performances with such low tightening pressure in comparison with the conventional fuel cells using separators comprising carbon plates, in which a high tightening pressure of about 20 kgf/cm² was needed. When the tightening pressure selected was lower than the above, the resultant cell performances get deteriorated due to gas leakage and higher contact resistances between the constituent elements. On the other hand, when the tightening pressure selected was too high, the resultant cell performances get deteriorated as well due to crushing of the ribs of the electrically conductive separators, which damages the gas flow and the cooling water flow. In short, it was important to adjust the tightening pressure by using the elasticity of the electrically conductive separators.

The thus made polymer electrolyte fuel cell according to the present Example was maintained at 85° C., wherein a hydrogen gas humidified and heated to have a dew point of 83° C. was supplied to the anode, and air humidified and heated to have a dew point of 78° C. was supplied to the cathode. As a result thereof, open-circuit voltage of 50 V was obtained under non-load operation, which did not output electric current to outside.

Figure 6:
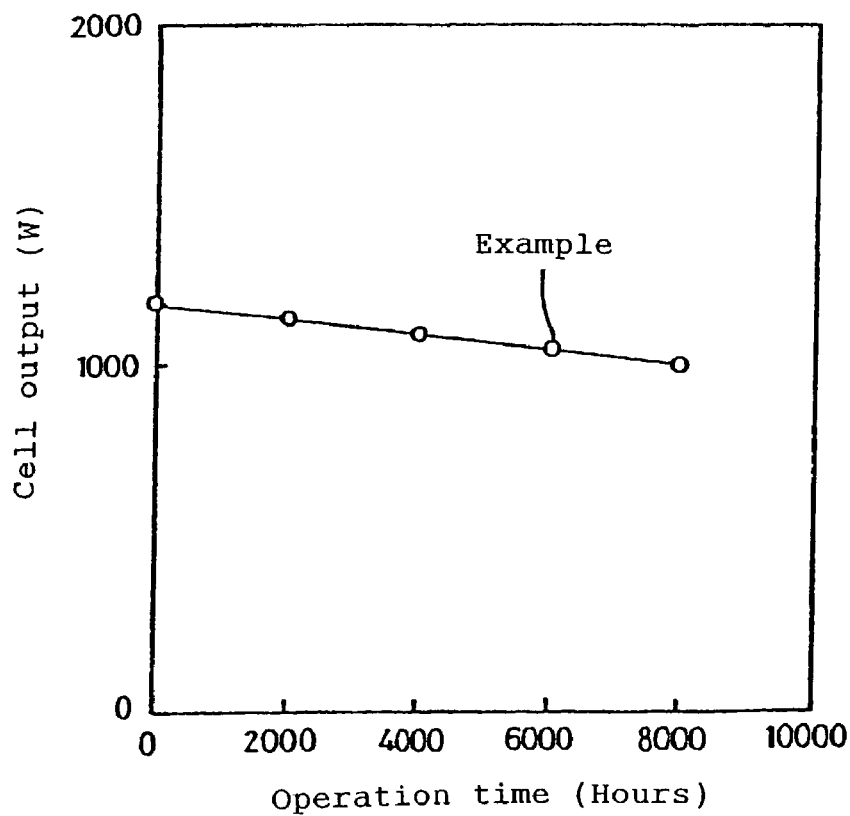
FIG. 6 is a graph showing variation, with time, of the output characteristics of the fuel cell according to the Example of the present invention.

This cell was subjected to a continuous power generation test under the conditions of a fuel utilization rate of 80%, an oxygen utilization rate of 40% and an electric current density of 0.5 A/cm². The variation, with time, of the output characteristics thereupon is shown in FIG. 6. It was confirmed that the cell according to the present Example maintained a cell output of 1,000 W (22 V–45 A) for a period of 8,000 hours or more.

The cell according to the present Example was particularly resistant against vibrations and shocks, because it has such structure that the MEAs are sandwiched by elastic separators. When conventional cells comprising separators made of carbon were dropped from a height of 2 m, the separators got cracked by about 10 times dropping on the average. The cells of the present Example did not show any irrecoverable damage even after the dropping test of about 100 times, except for some loosening of the rods at the tightening portions.

EXAMPLE 2

In the present Example, as an electrically conductive gas tight elastic body, such product was used as made by mixing an inorganic electrically conductive agent with a polymer elastic body, as a base material, which body has, as a principal chain backbone, the ethylene-propylene random copolymer represented by the formula (2).

A formulated concentrate for separators was prepared by sufficiently mixing a mixture of: 100 g of a liquid oligomer of an ethylene-propylene random copolymer represented by the formula (2), where the terminal groups X and Y were acryloyl group, the copolymerization ratio was 1:m:n=1:1:1, and the sum of 1+m+n was about 60; 50 g of acetylene black; 50 g of fibrous graphite (having an average diameter of 50 μm, and an average length of 0.5 mm); and 200 g of methyl ethyl ketone for viscosity adjustment. This formulated concentrate was poured into a mold made of stainless steel, and maintained at 50° C. in a reduced pressure atmosphere of 0.1 atmospheric pressure for 2 hours, whereby the methyl ethyl ketone therein was evaporated. Then, an electrically conductive sheet was made by subjecting the thus processed material to electron beam irradiation of an accelerating voltage of 500 keV and an exposure quantity of 50 Mrad so as to polymerize the acryloyl groups at the terminals of the oligomers. The degree of polymerization in this case, i.e. 1+m+n, was about 7,000.

When the degree of polymerization of the oligomer was selected to be higher than 20,000, the resultant sheet was hard, and thus its contact resistance with an MEA could not be lowered unless the tightening pressure for cell assembling was heightened. On the other hand, when the degree of polymerization was selected to be lower than 4,000, the resultant sheet was so soft that grooves of gas flow channels formed on a separator surface were crushed by the tightening pressure for cell assembling. Influences by the degree of polymerization were studied by controlling the exposure quantity of the electron beam, whereby it was found that when the degree of polymerization was lower than 5,000, the resultant sheet was too soft, and the grooves of the gas flow channels were crushed as in the case described above.

By using separators comprising the thus made electrically conductive sheet, a cell similar to the one in Example 1 was assembled and its characteristics were evaluated under the same conditions as those in Example 1. As a result thereof, it was confirmed that the cell according to the present Example also has superior characteristics as in the case of the cell of Example 1. Regarding vibration resistance and shock resistance as well, superior results were obtained.

INDUSTRIAL APPLICABILITY

According to the present invention, very much cost reduction can be realized, because separators are made by using an electrically conductive gas tight elastic body having acid resistance instead of conventionally used carbon plate cutting process. Furthermore, it also realizes extremely superior vibration resistance and shock resistance, so that it is suitable particularly for power sources in electric vehicles.

The invention claimed is:

1. A polymer electrolyte fuel cell comprising: a hydrogen ion conductive polymer electrolyte membrane; an anode and a cathode for sandwiching therebetween said hydrogen ion conductive polymer electrolyte membrane; an anode side electrically conductive separator having a gas flow channel for supplying a fuel gas to said anode and a cathode side electrically conductive separator having a gas flow channel for supplying an oxidant gas to said cathode, characterized in that each of said anode side and cathode side electrically conductive separators comprises an electrically conductive gas tight elastic body having acid resistance and comprising: (a) a polymer elastic body as a base material which has, as a principal chain backbone, polyisobutylene represented by formula (1); and (b) at least an inorganic electrically conductive agent mixed with said base material:

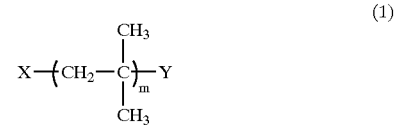
(1)

where X and Y are polymerizable functional groups, and m is an integer of 1 or above, representing repetition number of isobutylene oligomer, and wherein a ratio of an amount of the base material to an amount of the inorganic electrically conductive agent is 90 to 30 wt % to 10 to 70 wt %.

2. The polymer electrolyte fuel cell according to claim 1, wherein said polymerizable functional groups X and Y in said formula (1) are selected from the group consisting of allyl group, acryloyl group, methacryloyl group, isocyanate group and epoxy group.

\* \* \* \* \*